(12) United States Patent
Cameron et al.

(10) Patent No.: US 8,170,412 B2
(45) Date of Patent: *May 1, 2012

(54) PLATFORM FOR STEREOSCOPIC IMAGE ACQUISITION

(75) Inventors: James Cameron, Malibu, CA (US);
Vincent Pace, Shadow Hills, CA (US);
Patrick Campbell, Stevenson Ranch, CA (US)

(73) Assignees: James Cameron, Burbank, CA (US);
Vincent Pace, Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/642,386

(22) Filed: Dec. 18, 2009

(65) Prior Publication Data

US 2010/0098402 A1    Apr. 22, 2010

Related U.S. Application Data

(63) Continuation of application No. 11/422,048, filed on Jun. 2, 2006, now Pat. No. 7,643,748.

(51) Int. Cl.
*G03B 35/00* (2006.01)

(52) U.S. Cl. ...... 396/325; 359/391; 359/393; 248/187.1

(58) Field of Classification Search .................. 396/325, 396/329; 352/38, 53; 359/391, 393; 248/187.1
See application file for complete search history.

(56) References Cited

U.S. PATENT DOCUMENTS

| | | | |
|---|---|---|---|
| 3,769,890 A | 11/1973 | Alasia | |
| 4,557,570 A * | 12/1985 | Hines | 396/325 |
| 4,598,956 A * | 7/1986 | Teramachi | 384/45 |
| 4,650,305 A * | 3/1987 | Hines | 396/325 |
| 4,751,570 A | 6/1988 | Robinson | |
| 4,881,122 A | 11/1989 | Murakami | |
| 4,888,509 A | 12/1989 | Tomasek | |
| 5,063,441 A | 11/1991 | Lipton et al. | |
| 5,140,415 A | 8/1992 | Choquet | |
| 5,175,616 A | 12/1992 | Milgram | |
| 5,612,735 A | 3/1997 | Haskell et al. | |
| 5,737,657 A | 4/1998 | Paddock et al. | |
| 5,740,337 A | 4/1998 | Okino et al. | |
| 5,778,268 A | 7/1998 | Inaba | |
| 5,949,477 A | 9/1999 | Hoglin | |
| 5,978,015 A * | 11/1999 | Ishibashi et al. | 348/47 |
| 6,144,701 A | 11/2000 | Chiang | |

(Continued)

OTHER PUBLICATIONS

Matt Hurwitz, Dreaming in 3D, CineGear Expo News, The Official CineGear Expo Show Newspaper, Jun. 3-5, 2005, pp. 18-19.

(Continued)

*Primary Examiner* — Clayton E Laballe
*Assistant Examiner* — Linda B Smith
(74) *Attorney, Agent, or Firm* — SoCal IP Law Group LLP; John E. Gunther; Steven C. Sereboff

(57) ABSTRACT

There is disclosed a method and apparatus for acquiring stereoscopic images. A first camera may be mounted to a first convergence plate, the first convergence plate coupled to a first plate via a first XY slide and a first pivot displaced from the first XY slide. A distance between the first plate and a second plate may be adjusted to set an interocular distance between the first camera and a second camera. The first convergence plate may be rotated about the first pivot to set, at least in part, an angle of convergence between the first camera and the second camera.

14 Claims, 9 Drawing Sheets

U.S. PATENT DOCUMENTS

| | | | |
|---|---|---|---|
| 6,157,337 | A | 12/2000 | Sato |
| 6,292,634 | B1 | 9/2001 | Inaba |
| 6,414,709 | B1 | 7/2002 | Palm et al. |
| 6,466,746 | B2 | 10/2002 | Inaba |
| 6,701,081 | B1 | 3/2004 | Dwyer et al. |
| 6,731,025 | B2 | 5/2004 | Dawson |
| 6,757,053 | B1 | 6/2004 | Hazelton et al. |
| 6,839,082 | B2 | 1/2005 | Lee |
| 6,950,121 | B2 | 9/2005 | Tserkovnyuk et al. |
| 2002/0009137 | A1 | 1/2002 | Nelson et al. |
| 2002/0012043 | A1 | 1/2002 | Guerin et al. |
| 2003/0174203 | A1 | 9/2003 | Takeno et al. |
| 2004/0070667 | A1 | 4/2004 | Ando |
| 2005/0041095 | A1 | 2/2005 | Butler-Smith et al. |
| 2005/0185712 | A1 | 8/2005 | Lee |
| 2007/0140682 | A1 | 6/2007 | Butler-Smith et al. |
| 2007/0146478 | A1 | 6/2007 | Butler-Smith et al. |
| 2010/0026809 | A1 | 2/2010 | Curry |

OTHER PUBLICATIONS

Vincent Pace, RCS Sled—Images of the RCS described in the Matt Hurwitz, Deaming in 3D article disclosed above, and Date is Unknown.

Velmex, Inc. Company Website, "Unislide Electro-mechanical Assemblies", Dec. 17, 2002, Catalog.

Velmex, Inc. Company Website, "XY Tables with Large Work Plates", Feb. 25, 2003, Catalog.

* cited by examiner

PLATFORM FOR STEREOSCOPIC IMAGE ACQUISITION

RELATED APPLICATION INFORMATION

This patent claims priority from non-provisional patent application Ser. No. 11/422,048, filed Jun. 2, 2006, entitled PLATFORM FOR STEREOSCOPIC IMAGE ACQUISITION now U.S. Pat. No. 7,643,748.

BACKGROUND

1. Field

This disclosure relates to stereoscopy.

2. Description of the Related Art

Humans view the environment three-dimensionally using binocular vision. Binocular vision is both a visual system and an analytical system. Our brain perceives both distance and speed based, in part, on triangulating visual light information received by the retinas of our respective laterally separated, forward facing eyes. Since both eyes are forward facing, the field of view overlaps with each of our eyes having a slightly different perspective of the same area. As we focus on objects closer to our eyes, our eyes rotate towards each other, increasing the angle of convergence. As we focus on objects afar, our eyes rotate towards a parallel view, decreasing the angle of convergence.

Three dimensional imaging, also known as stereoscopy, dates, at least, as far back as 1838. Cinematographers frequently mount two lenses laterally apart a similar distance as an average human's eyes, approximately 65 mm. The effective distance of the lenses from each other is known as interocular distance.

Stereoscopic projection generally includes projecting two distinct images, one representing a view from the left eye and the other representing a view from the right eye. With regard to the silver screen, the illusion of depth has been effected via polarization, filters, glasses, projectors, shutters and arrays.

DETAILED DESCRIPTION

Throughout this description, the embodiments and examples shown should be considered as exemplars, rather than limitations on the apparatus and methods disclosed or claimed.

Description of Apparatus

Figure 1:
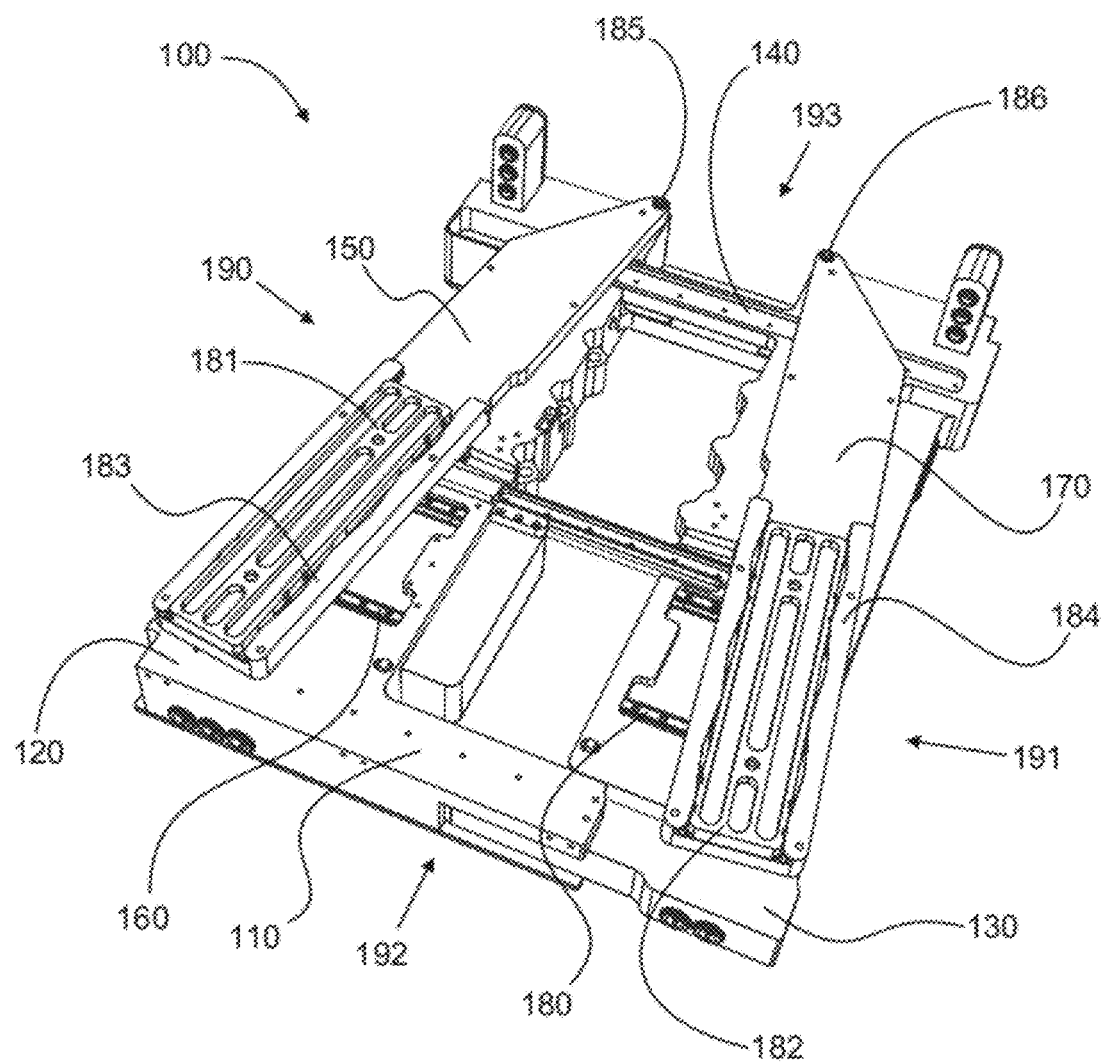
FIG. 1 is an elevated plan view of a platform.

Referring now to FIG. 1, there is shown an elevated plan view of a platform 100. The relative position of various parts of the platform 100 will be described based upon this view. For example, terms such as top, bottom, left and right are used. However, the platform 100 may be used in various positions such as upside down. Thus, some descriptive terms are used in relative terms and not absolute terms. The platform 100 may be a prop adapted for use in stereoscopic image acquisition. The platform 100 may include rigid components and provide mechanical support to digital cinema equipment. The platform 100 may be a device adapted to hold and/or move parts, such as still cameras, video cameras, or other image acquisition devices in or to a predetermined position.

Examples of image acquisition devices include charged coupled devices, complementary metal-oxide semiconductor (CMOS) devices, film and other devices. Image acquisition devices may acquire visual information singly or in sequence as in motion video.

The platform 100 includes a base 110 having a first plate 120 and a second plate 130 attached via a linear slide 140. The platform 100 includes a first convergence plate 150 attached to the first plate 120 via a first pivot 185 and a first compound crossed roller slide 160. The platform 100 includes a second convergence plate 170 attached to the second plate 130 via a second pivot 186 and a second compound crossed roller slide 180.

The platform 100 may be constructed of materials that have characteristics of high strength, light weight and high rigidity. Examples of such materials include aluminum, titanium, and magnesium alloys. The platform 100 may be of small relative size so that robust steel alloys may be utilized for low cost manufacturing.

The platform 100 may include a first camera mount 181 that may attach to a top surface 183 of the first convergence plate 150. The platform 100 may include a second camera mount 182 that may attach to a top surface 184 of the second convergence plate 170.

Figure 2:
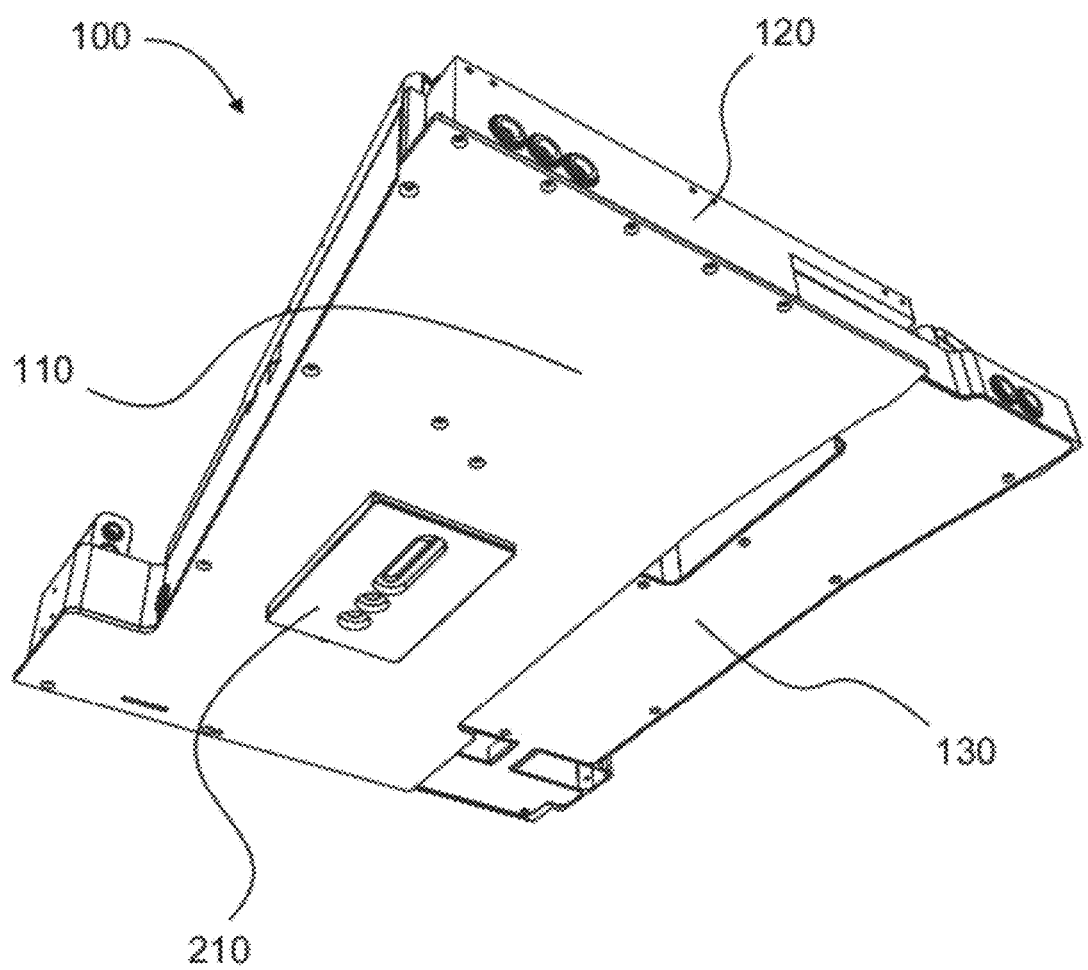
FIG. 2 is an underside plan view of a platform.

As shown in the top side view of FIG. 1, the platform 100 may include a left side 190, a right side 191, a rear side 192 and a front side 193. As shown in the underside plan view of the platform 100 in FIG. 2, the platform 100 may include a mounting device 210. The mounting device 210 may be adapted to attach the platform 100 to a support (not shown). The support may be a tripod, a steadicam, a crane, a boom, underwater housings, custom pan and tilt armatures, helicopter mounts, euromounts, or other device that may support a platform 100 for use in stereoscopic cinematography. A steadicam may have a maximum load capacity of approximately 45 pounds. Thus, with regard to use with a steadicam, a lightweight platform 100 may be utilized. Because the platform 100 may be attached to a variety of stationary or moveable devices, the platform 100 may be used in myriad positions, and have the front 193 facing any direction. The platform 100 may be adapted to allow an image acquisition device to receive images that beyond the front 193 of the fixture 100.

The base 110 is a structure to which operating parts of a system may be attached. The base 110 may be formed from a unitary object or may be an assembly of components. The base 110 may be symmetric or asymmetric.

Figure 3:
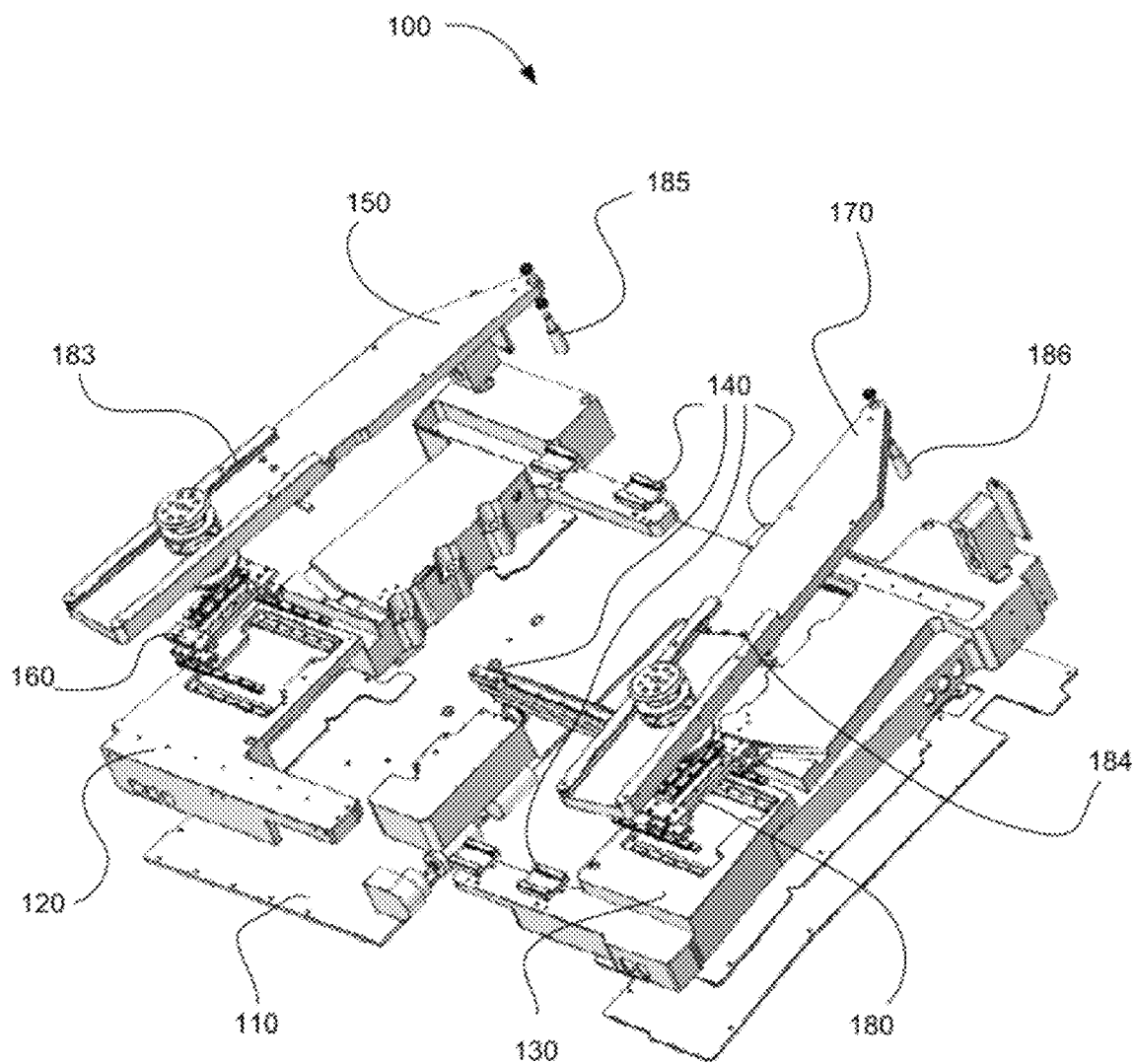
FIG. 3 is an exploded elevated plan view of a platform.
Figure 4:
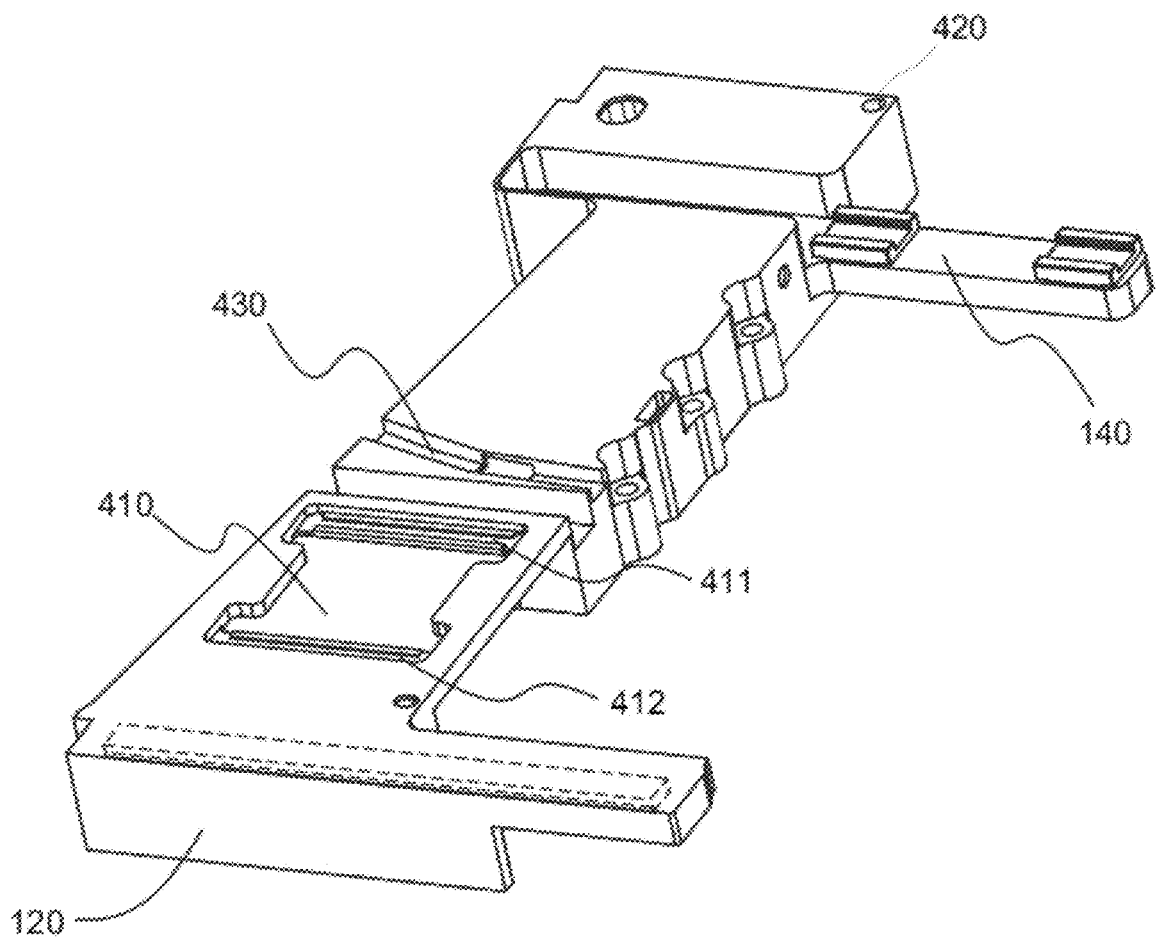
FIG. 4 is an elevated plan view of a plate.
Figure 5:
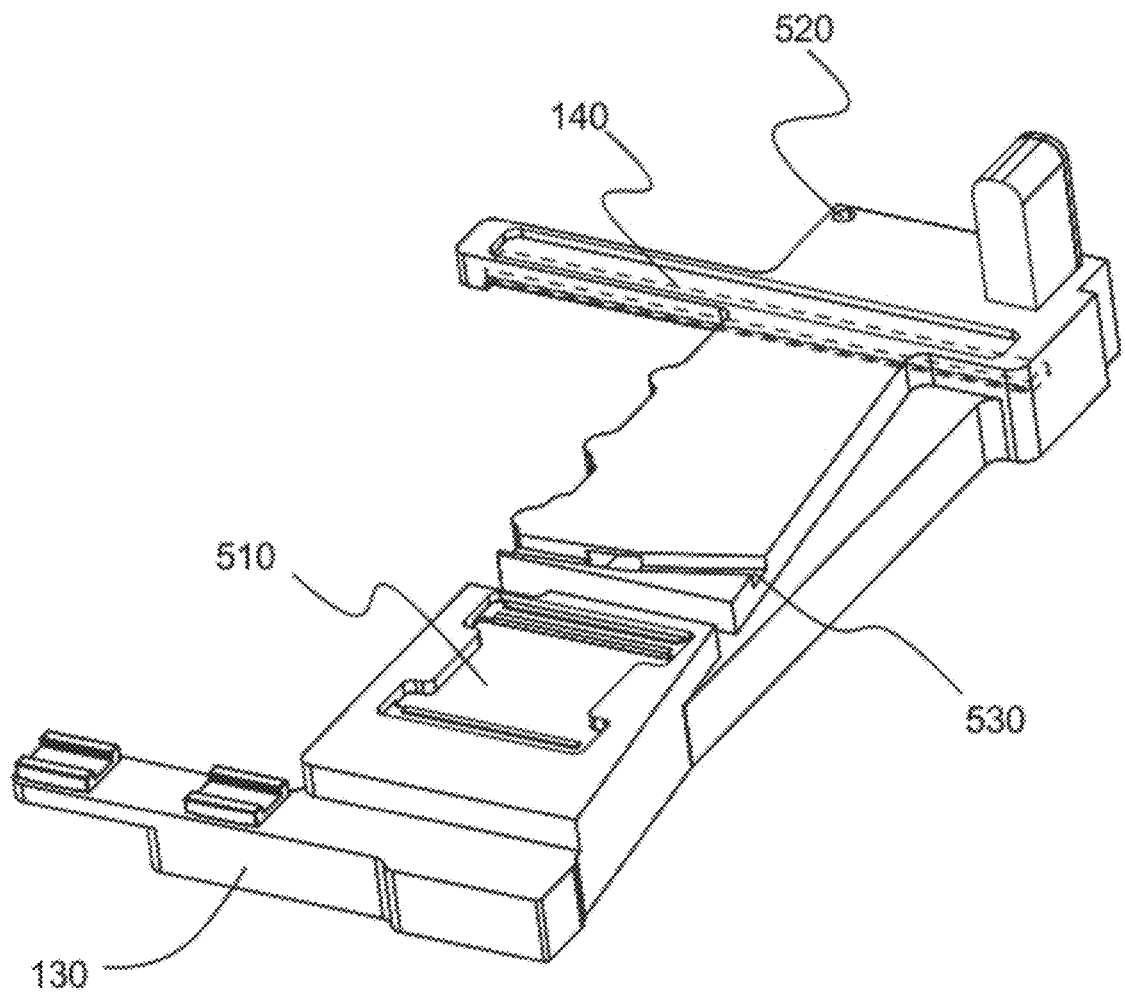
FIG. 5 is an elevated plan view of a plate.
Figure 6:
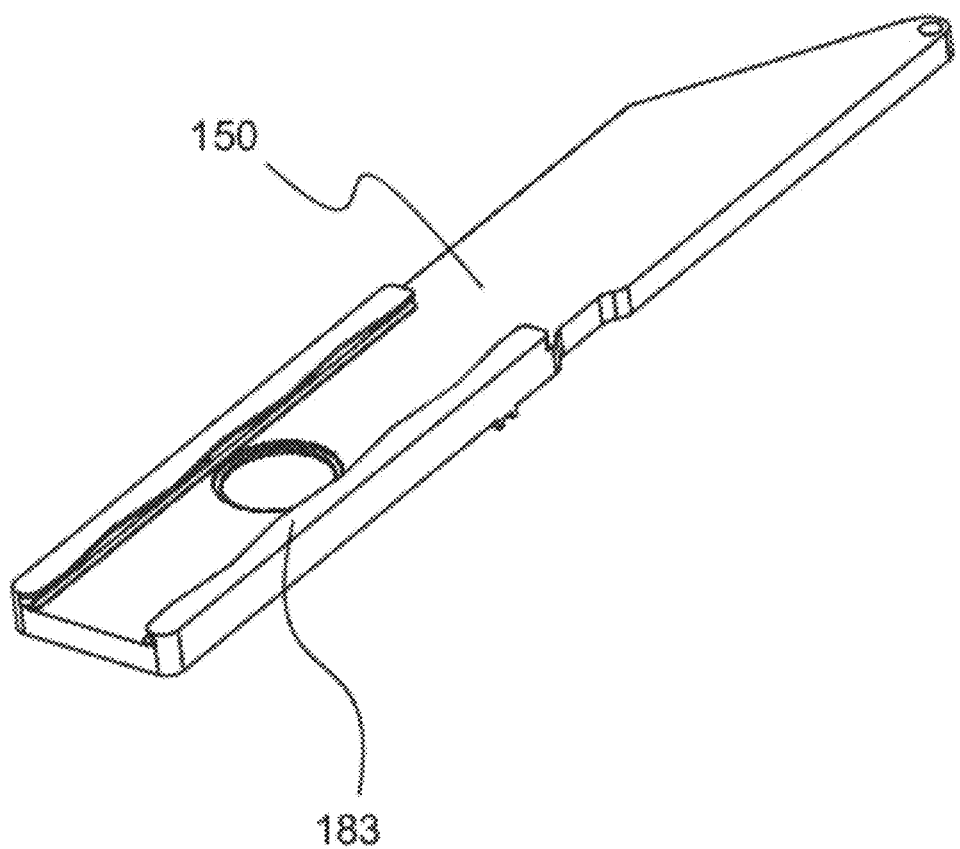
FIG. 6 is an elevated plan view of a convergence plate.

Referring now to the exploded elevated plan view of a platform 100 in FIG. 3, the elevated plan view of a platform in FIG. 4 and the elevated plan view of a platform in FIG. 5, the second plate 130 includes a linear slide 140. The linear slide 140 may be adapted to allow the second plate 130 to be displaced laterally relative the first plate 120.

The linear slide 140 may provide structural support and stability to the second plate 130 from the first plate 120. The linear slide 140 may be adapted for precise, high speed linear motion. The linear slide 140 may have characteristics including a low coefficient of friction and low acoustic output. In turn, the linear slide 140 may be characterized by smooth, noiseless motion. Additionally, the linear slide 140 may resist moments, such that the second plate resists roll and tilt. Tilt refers to angular displacement about the longitudinal axis of a device. Roll refers to rotation about the longitudinal axis of a device.

Common examples of linear slides include shaft guidings, profile rail guides, cam-roller guides, precision rail guides, miniature slides and standard slides. The selection of the linear slide 140 may be based on the load it must support, the acceleration and velocity it will be subjected to and the resistance to roll and tilt the linear slide 140 must provide. For example, in precision cinematography, the linear slide 140 may be a precision rail guide or a crossed roller slide. For stability enhancement, plural linear slides 140 may support the second plate 130 via the first plate 120. As shown in FIG. 3, the linear slide 140 includes two rails in parallel. By utilizing a plurality of rails, lateral motion of the second plate 130 relative the first plate 120 is limited to motion within a plane.

The first plate 120 and the second plate 130 may each be a platform, a permanent or temporary mounting member. The first plate 120 and the second plate 130 may each have a geometry of a general rectangular solid. Additional embodiments may include a first plate 120 and a second plate 130 having geometries of a triangular solid or other regular or irregular geometry. The first plate 120 and the second plate 130 may be symmetric or asymmetric in shape. The smaller the second plate 130 is, the less load that the linear slide 140 will be required to support.

The first plate 120 may include a section 410 (FIG. 4) adapted to engage or be integrated with the first compound crossed roller slide 160 (described in further detail with regard to FIG. 8 and FIG. 9 below). The term engage refers to coming into contact with or interlocking with a device. The section 410 may include a single or plural rails or guides. The selection of the number of rails or guides may be based on the stability required for the application of the platform 100. The example shown includes two guides 411, 412 assembled to the section 410. The selection of parallel guides aid in restricting the first compound crossed roller slide 160 to planar motion. Similarly, the second plate 130 may include a section 510 adapted to engage or be integrated with the second compound crossed roller slide.

The first plate 120 and the second plate 130 may respectively have a depression or hole 420 and 520. The depressions 420 and 520 may be adapted to receive the first pivot 185 and a second pivot 186, respectively. The depressions 420 and 520 may include a polished surface having a low friction coating, for example, wax or polytetrafluoroethylene. Pivots are devices, typically with a geometry of a shaft, a ball or a pin, about which members rotate. The holes 420 and 520 may be offset from the sections 410 and 510 a predetermined distance in order to select a radius for rotation of cameras (not shown) or other image acquisition devices. The first pivot 185 and the second pivot 186 may include elements, such as a threaded shaft and collar, which aid in the alignment of the convergence plates 150 and 170.

The first plate 120 and the second plate 130 may respectively have a groove 430, 530. The grooves 430 and 530 may be configured in a predetermined arc, linearly, or other irregular path. The grooves 430, 530 and/or the pivots 185, 186 may be utilized to guide motion for cameras (not shown) or other image acquisition devices.

The convergence plates 150, 170 each may be a rigid member adapted to support an image acquisition device. The convergence plates 150, 170 may have a geometry which includes a generally flat top surface. The convergence plates 150, 170 may include respective surfaces 183, 184 adapted to affix to the convergence plates 150, 170 either a respective mounting device 181, 182 or an image acquisition device (not shown).

Figure 7:
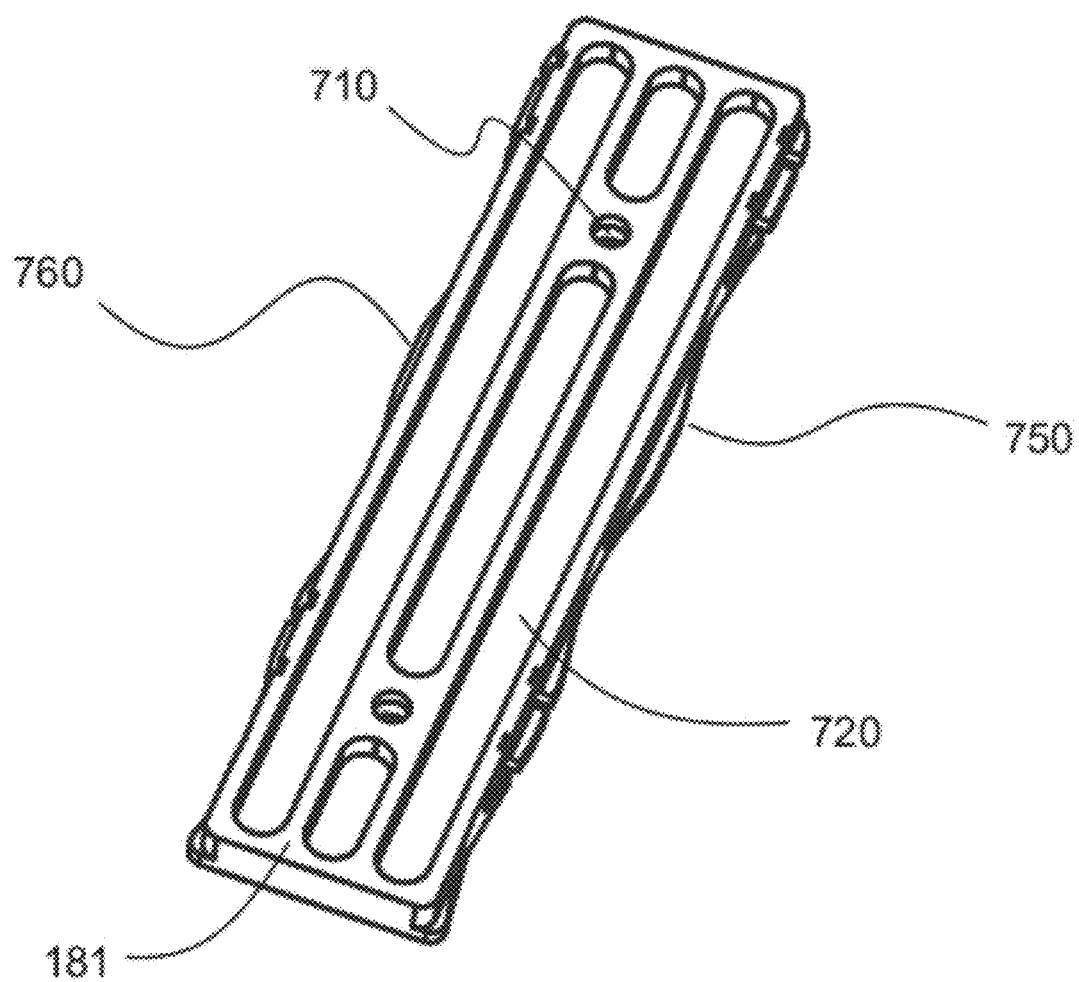
FIG. 7 is an elevated plan view of a camera mount.

Referring now to the elevated plan view of FIG. 7, there is shown a mounting device 181. A camera (not shown) may be mounted to the mounting device 181 to enable quick and easy mounting to the top surface 183 of the convergence plate 150. Image acquisition devices may be mounted to the mounting device 181 via fasteners, magnets, or adhesives. Image acquisition devices may be integrated with the mounting device 181.

In the film industry, quick precision swapping of cameras is a cost factor that effects profitability. The mounting device 181 may include one or a plurality of holes 710 or openings 720 to which fasteners may be utilized to affix a camera. The mounting device 181 may also include edges 750, 760 which may be scalloped, flat, or have a regular or irregular geometry adapted for specific mounting applications.

Referring again to FIG. 1, the surfaces 183, 184 of the respective convergence plates 150, 170 may be scalloped, flat, or have a regular or irregular geometry adapted for a specific mounting device. The term scalloped refers to a wavy edged geometry. Based on the geometry of the mounting devices 181, 182 and the respective convergence plates 150, 170, the mounting devices 181, 182 may be either slid onto the respective convergence plates 150, 170 or set down perpendicularly onto the respective convergence plates 150, 170. This may allow for the quick swapping of image acquisition devices in tight spaces.

In turn, the convergence plates 150, 170 may be able to better prevent an image acquisition device (not shown) from rolling or tilting while the second plate 130 is moving laterally from the first plate 120 and/or the convergence plates 150, 170 are sliding and/or rotating.

The compound crossed roller slides 160, 180 may provide substantial mechanical support both to the convergence plates 150, 170, the mounting devices 181, 182 and the image acquisition devices (not shown). The compound crossed roller slides 160, 180 are respectively attached to the respective convergence plates 150, 170 and the respective plates 120, 130. The compound crossed roller slides 160, 180 may be attached to the respective convergence plates 150, 170 by a bearing, pin or other pivoting or rotating device that allows the convergence plates 150, 170 to rotate while traveling in a predetermined plane. The term compound refers to precision combination of generally perpendicular crossed roller slides enabling displacement and/or rotation within a single plane. Examples of a compound crossed roller slide include an XY slide and an XY stage. The compound crossed roller slides 160, 180 may include a plurality of rails and bearings to enable stability and resistance to motion outside of a predetermined plane.

Substantial mechanical support refers to a large degree or main portion of mechanical support. For example, when the platform 110 is in motion and/or the second plate 130 is moving laterally from the first plate 120 and/or the convergence plates 150, 170 are sliding and/or rotating, the mass of the image acquisition devices (not shown) in combination with the convergence plates 150, 170 may exert moments which tend to cause the image acquisition devices to roll or tilt. The compound crossed roller slides 160, 180, by providing substantial mechanical support from the plates 120, 130 to the convergence plates 150, 170 and image acquisition devices may limit the motion of the image acquisition devices to remain within a single plane.

By virtue of the attachment, engagement or integration between the compound crossed roller slides 160, 180, the respective convergence plates 150, 170 and the plates 120, 130, the convergence plates 150, 170 are able to support image acquisition devices through a variety of motions, including 360 degree roll, tilt and yaw. Thus, even when upside down or at creative angles, the platform 100 restricts the motion of the convergence plates 150, 170 to a plane.

Figure 8:
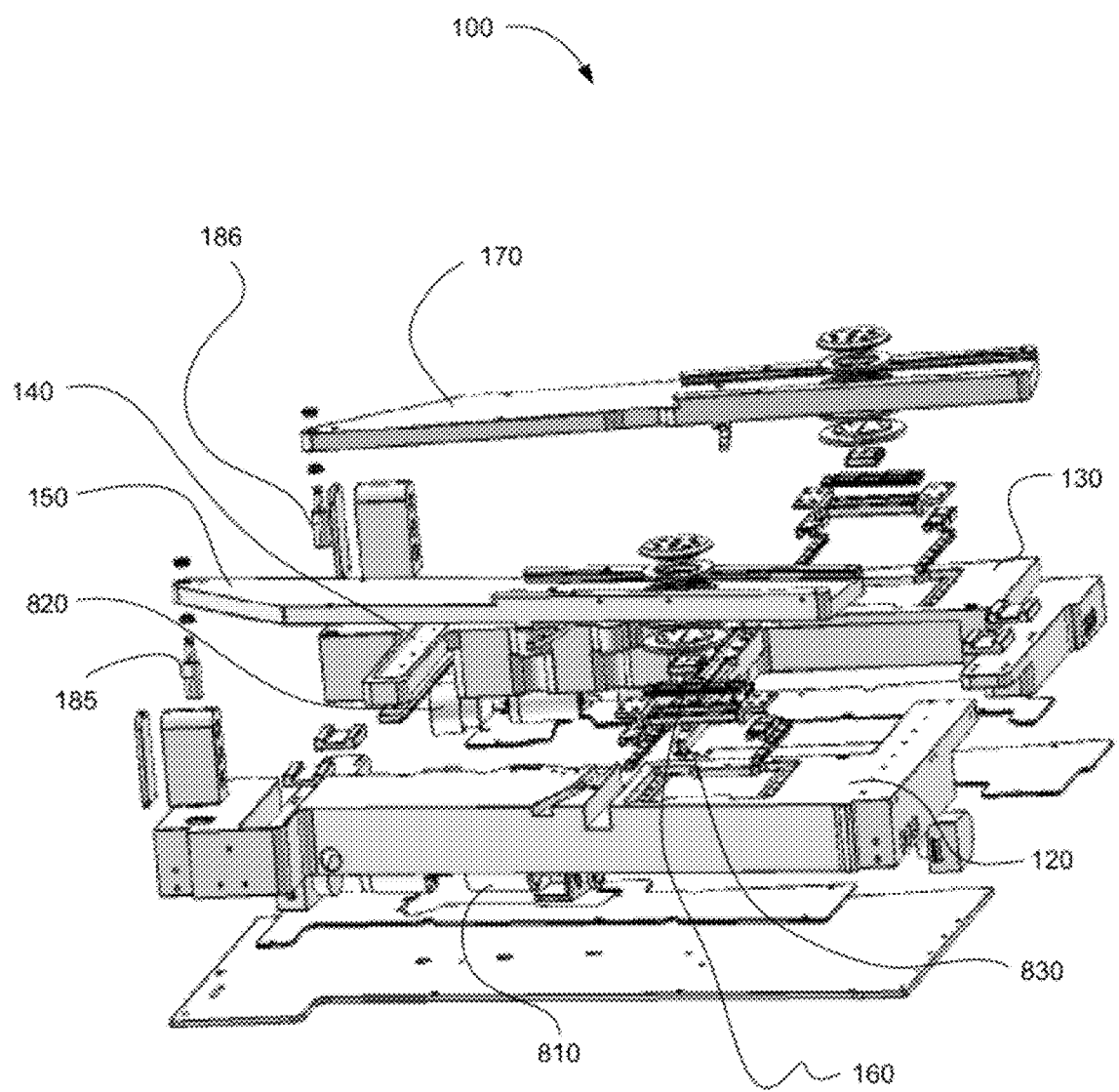
FIG. 8 is an exploded side view of a platform.
Figure 9:
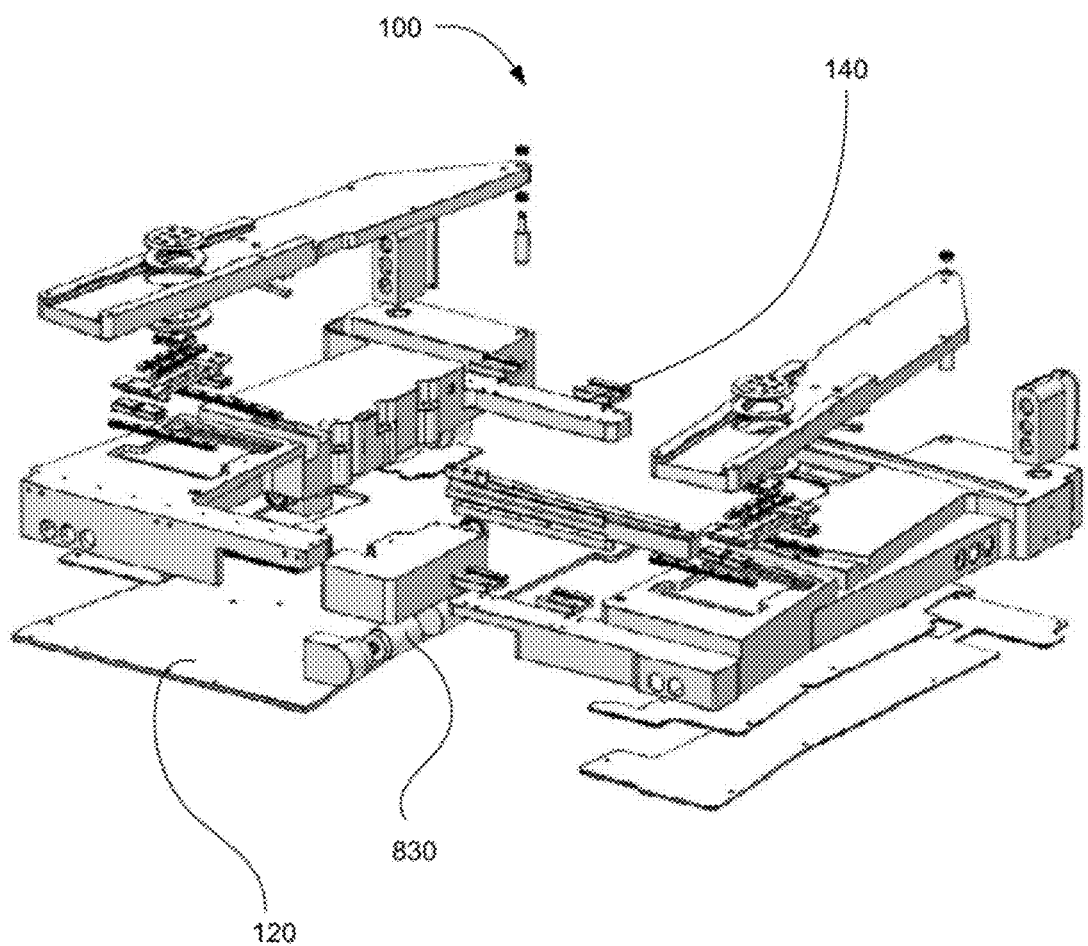
FIG. 9 is an exploded rear view of a platform.

Referring now to FIGS. 5, 8 and 9, there are shown an exploded side and rear view of a platform, respectively. The platform 100 may include a first motor 810, a second motor 820 and a third motor 830. The first motor 810 may be mounted to the first plate 120. The second motor 820 may be mounted to the second plate 130. The third motor 830 may be mounted to the first plate 120.

The first motor 810 may be adapted to rotate and/or displace the first convergence plate 150. The first motor 810 may cause the first convergence plate 150 to move via a rack and pinion, via a gear set, via a belt, via a lead screw, via the compound crossed roller slide 160 or other displacement methods. Similarly, the second motor 820 may be adapted to rotate and/or displace the second convergence plate 170. The motors 810 and 820 may cause the convergence plates 150, 170 to rotate and/or displace symmetrically.

Rotation and/or displacement of the convergence plates 150, 170 may enable image acquisition which may be utilized to create an illusory stereoscopic experience. For example, when the first convergence plate 150 is rotated counter-clockwise about the first pivot 185 and the second convergence plate 170 is rotated clockwise about the second pivot 186, the angle of convergence is decreased. The resulting effect is one of shifting stereoscopic depth of field from a close position to a far position.

Conversely, when the first convergence plate 150 is rotated clockwise about the first pivot 185 and the second convergence plate 170 is rotated counter-clockwise about the second pivot 186, the angle of convergence is increased. The resulting effect is one of shifting stereoscopic depth of field from a far position to a close position.

The third motor 830 may cause the second plate 130 to displace laterally relative the first plate 120. When the second plate 130 is shifted away from the first plate 120, the interocular distance between the image acquisition devices (not shown) mounted to the convergence plates 150, 170 is increased. The resulting effect is one of developing a greater stereoscopic depth of field. Conversely, when the second plate 130 is shifted towards the first plate 120, the interocular distance between the image acquisition devices (not shown) mounted to the convergence plates 150, 170 is decreased. The resulting effect is one of developing a lesser stereoscopic depth of field.

The motors 810, 820 and 830 may be controlled manually, via predetermined computer algorithms, or a combination of both. For example, formulas may associate convergence angle and/or interocular distance with an object focused on. Moreover, the cameras (not shown) mounted to the convergence plates 150, 170 may be different cameras or have different characteristics in order to define a creative experience. Selection of the interocular distance and convergence angle are defining characteristics, the creativity which enables a lucid stereoscopic illusion.

The motors 810, 820 and 830 may be DC motors, servo motors, brushless servo motors or other motors. Servo motors are designed to control high speed and high power movements via error-sensing feedback. Servo motors enable high accuracy in positioning. Servo motors have characteristics of low friction, high speed, precision and low inertia Brushless servo motors have characteristics of longevity, low acoustic or audible noise output and low electromagnetic output. Electromagnetic output may cause radio frequency interference which cause other electronic devices, such as image acquisition devices, to malfunction and/or yield errors. If the motors 810, 820 and 830 yield low acoustical and electromagnetic output, then less post processing of the image and/or audio acquisition will be required for an audio visual work of art. Post processing tends to be very expensive.

The platform 100 described herein provides for light weight, compact portability, ease in packaging, ease of setting up at a production site, and compatibility with motion picture conventions. Because of the load bearing and low friction characteristics of the compound crossed roller slides 160, 180 and the crossed roller slide 140 in combination with motors 810, 820 and 830 having characteristics of high speed, precision and low acoustical and electromagnetic noise, a cinematographer may rapidly acquire high quality audio-visual information.

The platform 100 provides for simultaneous active and/or manual interocular control and convergence angle control. Moreover, the cinematographer is able to use the platform 100 to efficiently create a stereoscopic experience that an audience can comfortably experience for a duration of a full length motion picture without the need for extensive post processing. More specifically, use of platform 100 reduces the need to post process convergence for a given shot for a desired stereoscopic effect because a desired stereoscopic effect may be selected during image acquisition.

Closing Comments

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. An method for acquiring stereoscopic images, comprising:

mounting a first camera to a first convergence plate, the first convergence plate coupled to a first plate by a first XY slide and by a first pivot displaced from the first XY slide adjusting a distance between the first plate and a second plate to set an interocular distance between the first camera and a second camera rotating the first convergence plate about the first pivot to set, at least in part, an angle of convergence between the first camera and the second camera.

2. The method of claim 1, wherein rotating the first convergence plate comprises controlling a first motor coupled to the first XY slide.

3. The method of claim 1, further comprising:

mounting a second camera to a second convergence plate, the second convergence plate coupled to the second plate by a second XY slide and by a second pivot displaced from the second XY slide rotating the first and second convergence plates about the respective first and second pivots to set the angle of convergence between the first camera and the second camera.

4. The method of claim 3, wherein rotating the first and second convergence plates comprises controlling a first motor coupled to the first XY slide and controlling a second motor coupled to the second XY slide.

5. The method of claim 4, wherein the first plate is connected to the second plate by a linear slide adjusting a distance between the first plate and a second plate comprises controlling a third motor coupled to the linear slide.

6. An apparatus suited for use in stereoscopic image acquisition comprising:

a base having a mounting device and a first plate attached to a second plate via a linear slide a first convergence plate adapted to affix a first camera, the first convergence plate attached to the first plate by a first XY slide, the first convergence plate further attached to the first plate by a first pivot offset from the first XY slide.

7. The apparatus suited for use in stereoscopic image acquisition of claim 6, wherein the first plate is adapted to provide substantial mechanical support to the first convergence plate and the first camera via the first XY slide.

8. The apparatus suited for use in stereoscopic image acquisition of claim 7 wherein the first XY slide is adapted to provide substantial mechanical support to both the first convergence plate and the first camera when the first convergence plate rotates about the first pivot.

9. The apparatus suited for use in stereoscopic image acquisition of claim 8 wherein the second plate is adapted to provide substantial mechanical support to the first plate via the linear slide when the first plate is linearly displaced with respect to the second plate.

10. The apparatus suited for use in stereoscopic image acquisition of claim 9 wherein the XY slide and the linear slide are adapted to restrict roll and tilt of the first camera while the first plate is linearly displaced from the second plate and the first convergence plate is rotating about the first pivot.

11. The apparatus suited for use in stereoscopic image acquisition of claim 6, further comprising:

a first motor coupled to the first XY slide, the first motor adapted to rotate the first convergence plate about the first pivot.

12. The apparatus suited for use in stereoscopic image acquisition of claim 6, further comprising:

a second convergence plate adapted to affix a second camera, the second convergence plate attached to the second plate by a second XY slide, the second convergence plate further attached to the second plate by a second pivot offset from the second XY slide.

13. The apparatus suited for use in stereoscopic image acquisition of claim 12, further comprising:

a first motor coupled to the first XY slide, the first motor adapted to rotate the first convergence plate about the first pivot a second motor coupled to the second XY slide, the second motor adapted to rotate the second convergence plate about the second pivot.

14. The apparatus suited for use in stereoscopic image acquisition of claim 13, further comprising:

a third motor coupled to the linear slide, the third motor adapted to displace the first plate with respect to the second plate.

* * * * *